(12) United States Patent  
Bayart et al.

(10) Patent No.: US 12,431,839 B2  
(45) Date of Patent: Sep. 30, 2025

(54) FLOATING PHOTOVOLTAIC INSTALLATION

(71) Applicants: ELECTRICITE DE FRANCE, Paris (FR); CIEL ET TERRE INTERNATIONAL, Sainghin en Melantois (FR)

(72) Inventors: Gaëtan Bayart, Neuilly-Plaisance (FR); Rémi Le Berre, Moret-Loing-Et-Orvanne (FR); Benjamin Le Blan, Villeneuve d'Ascq (FR)

(73) Assignees: ELECTRICITE DE FRANCE, Paris (FR); CIEL ET TERRE INTERNATIONAL, Sainghin en Melantois (FR)

( * ) Notice: Subject to any disclaimer, the term of this patent is extended or adjusted under 35 U.S.C. 154(b) by 47 days.

(21) Appl. No.: 18/545,005

(22) Filed: Dec. 19, 2023

(65) Prior Publication Data

US 2024/0204719 A1   Jun. 20, 2024

(30) Foreign Application Priority Data

Dec. 20, 2022   (FR) ...................................... 2213931

(51) Int. Cl.  
*H02S 40/22* (2014.01)  
*H02S 20/00* (2014.01)  
*H02S 30/10* (2014.01)

(52) U.S. Cl.  
CPC .............. *H02S 40/22* (2014.12); *H02S 20/00* (2013.01); *H02S 30/10* (2014.12)

(58) Field of Classification Search  
CPC ......... H02S 20/00–32; H02S 40/20–22; Y02E 10/50–60; H10F 77/40–496

(Continued)

(56) References Cited

U.S. PATENT DOCUMENTS

2021/0214056 A1   7/2021   Harrison et al.  
2021/0336578 A1   10/2021   Bjørneklett

FOREIGN PATENT DOCUMENTS

DE   102021105404 A1 *  9/2022   ............. H02S 20/00  
JP   2020096494 A *  6/2020

(Continued)

OTHER PUBLICATIONS

DE-102021105404-A1 English (Year: 2022).*

(Continued)

*Primary Examiner* — Bach T Dinh  
(74) *Attorney, Agent, or Firm* — Maier & Maier, PLLC

(57) ABSTRACT

Some examples present a photovoltaic installation able to float and to allow producing electricity including a first photovoltaic module, a second photovoltaic module, a reflector and a flotation device able to make the photovoltaic installation float, wherein: each photovoltaic module includes a photovoltaic panel and a bearing structure, distinct from the flotation device and suited for carrying the photovoltaic panel; the two photovoltaic modules are oriented along a single axis and are aligned along this axis while being separated by a determined distance, the distance being suited for allowing the passage of an individual between the modules; and the reflector includes two opposite ends respectively assembled to the bearing structure of the first photovoltaic module and of the bearing structure of the second photovoltaic module.

13 Claims, 5 Drawing Sheets

(58) Field of Classification Search
USPC .................................................. 136/243–265
See application file for complete search history.

(56) References Cited

FOREIGN PATENT DOCUMENTS

| KR | 1020220087138 A | 6/2022 |
| WO | 2019160048 A1 | 8/2019 |
| WO | 2020122136 A1 | 6/2020 |

OTHER PUBLICATIONS

JP-2020096494-A English (Year: 2020).*
Search Report and Written Opinion issued on Jun. 21, 2023, in corresponding French Application No. 2213931, 16 pages.
Widayat et al., "Comparison and Optimization of Floating Bifacial and Monofacial Solar PV System in a Tropical Region", 2020 9th International Conference on Power Science and Engineering, 2020, pp. 66-70.

\* cited by examiner

FLOATING PHOTOVOLTAIC INSTALLATION

FIELD

The present disclosure relates to the field of floating photovoltaic installations.

BACKGROUND

Photovoltaic installations are today widely used for electricity production. There are in particular floating photovoltaic installations allowing producing electricity over water.

Floating photovoltaic installations may in particular comprise reflecting elements arranged above or on the surface of the water with which to reflect solar radiation and in particular photons captured by the photovoltaic panels of the installations, for the general purpose of increasing the electricity generated by these installations. The radiation reflected by these reflective elements is not however always optimal.

Further, the repair and maintenance operations for these floating photovoltaic installations are not necessarily easy for the operators once these installations are deployed on the water.

The present disclosure seeks to at least partially improve the situations mentioned above.

SUMMARY

In this respect, a photovoltaic installation able to float and to allow producing electricity is proposed. The photovoltaic installation comprises a first photovoltaic module, a second photovoltaic module, a reflector and a flotation device able to make the photovoltaic installation float, wherein:
  each photovoltaic module comprises a photovoltaic panel and a bearing structure, distinct from the flotation device, and adapted to carry the photovoltaic panel;
  the two photovoltaic modules are oriented along a single axis, and are aligned along this axis, while being separated by a determined distance, said distance being adapted to allow the passage of an individual between the modules; and
  the reflector comprises two opposite ends respectively assembled to the bearing structure of the first photovoltaic module and of the bearing structure of the second photovoltaic module.

According to one option, the photovoltaic panel of a module is a photovoltaic panel which is:
  monofacial which comprises an upper surface adapted to generate electricity by photovoltaic effect, or
  bifacial which comprises an upper surface and a lower surface suited for generating electricity by photovoltaic effect.

According to an option, the reflector is further adapted to support the weight of at least one person moving on the reflector between the two photovoltaic modules.

According to an option, the reflector is a reflecting tarpaulin.

According to an option, an end of the reflector assembled to the bearing structure of a photovoltaic module is arranged such that a section of the reflector extends under the photovoltaic panel of the photovoltaic module over at least 10% of the length of the panel along the orientation axis of the modules.

According to an option, the bearing structure for the photovoltaic modules is suited for raising the photovoltaic panel above the reflector.

According to an option, the bearing structures for the first and second photovoltaic modules comprise two bearing beams extending perpendicularly to the orientation axis of the photovoltaic modules; and an end of the reflector is assembled to a bearing beam of the first module closest to the second module and the other end of the reflector is assembled to the bearing beam of the second module closest to the first module.

According to an option, a bearing beam of a photovoltaic module on which an end of a reflector is assembled is set back from an edge of the photovoltaic panel extending perpendicularly to the orientation axis of the module, such that a section of the reflector extends under the photovoltaic panel along this orientation axis.

According to an option, the bearing structure of one photovoltaic module comprises two legs and a panel support:
  each leg having a lower end assembled to a respective bearing beam and an upper end assembled to the panel support; and
  the photovoltaic panel is assembled on the panel support.

According to an option, the reflector is a reflecting tarpaulin:
  an end of the reflecting tarpaulin comprises a rod extending along the length of the reflecting tarpaulin perpendicular to the axis of orientation of the modules; and
  a profile, shaped according to a shape complementary to that of the rod, extends over a specific bearing beam of a module on which an end of the reflecting tarpaulin is assembled such that the rod is received in the profile and that the end of the reflecting tarpaulin is kept assembled to the specific bearing beam.

According to an option, the profile is formed on a specific bearing beam and therefore constitutes an integral part of the specific bearing beam; or the profile is assembled to the specific bearing beam by an attachment system.

According to an option, the reflector is a reflecting tarpaulin:
  an end of the reflecting tarpaulin comprises a rod extending along the length of the reflecting tarpaulin perpendicular to the axis of orientation of the modules; and
  the rod is assembled to a bearing beam of a module on which an end of the reflecting tarpaulin is assembled by a tensioning system adapted to tension the reflecting tarpaulin.

According to an option, the photovoltaic installation comprises two rows of photovoltaic modules:
  a first row of photovoltaic modules comprises the first photovoltaic module and extends substantially perpendicular to the axis of orientation of the first and second photovoltaic modules;
  a second row of photovoltaic modules comprises the second photovoltaic module and extends substantially perpendicular to the orientation axis of the first and second photovoltaic modules; and
  the opposite ends of the reflector are assembled such that the reflector extends between the two rows of photovoltaic modules.

According to an option, the reflector is configured to avoid collecting water, i.e. to prevent water accumulation.

With the options for photovoltaic installations presented by the present disclosure, the photovoltaic production of the installations according to the prior art can be improved by clever arrangement of the reflectors between two aligned modules or between two rows of modules so as to reflect the solar radiation onto the photovoltaic panels of the installation. Further, in some options, the characteristics of these reflectors are such that they are suited for supporting the weight of a person, in that way these reflectors can be used as a walkway or path between two aligned modules and possibly between two rows of modules, notably for allowing the repair and maintenance thereof. In these options, the reflector therefore has a dual function: its primary function being to reflect the solar radiation to allow increasing the generation by the photovoltaic installation of electric production, and a secondary function being to create a usable path for operators in order to allow the repair and maintenance of the photovoltaic installation.

BRIEF DESCRIPTION OF THE DRAWINGS

Other characteristics, details and advantages will appear upon reading the following detailed description, and analyzing the attached drawings, on which.

DETAILED DESCRIPTION

Figure 1:
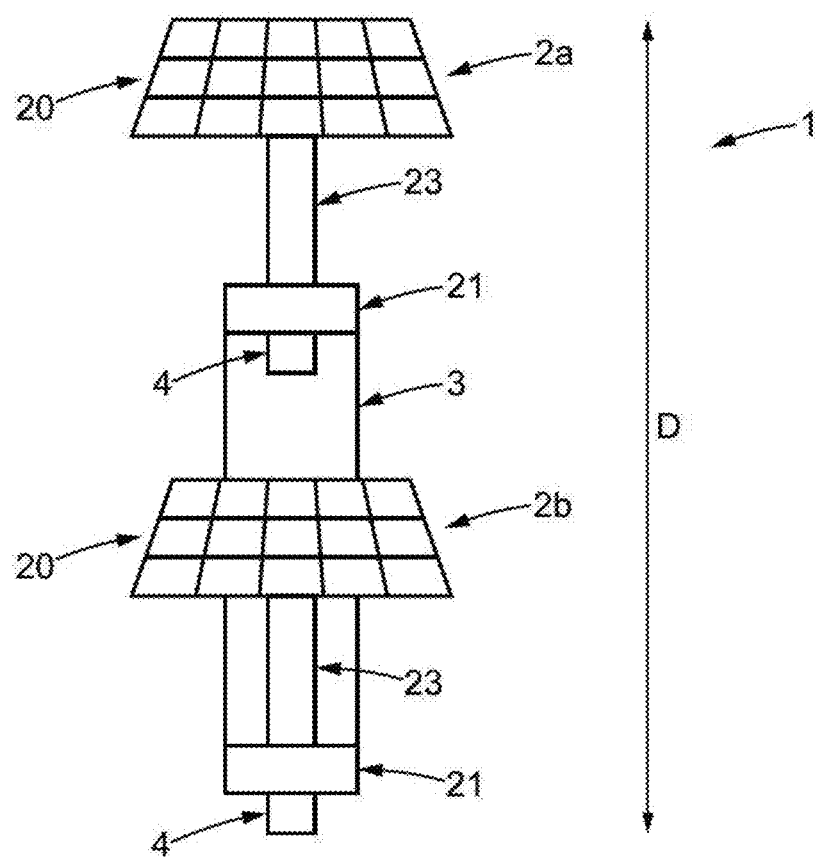
FIG. 1 schematically illustrates a first example of a photovoltaic installation.
Figure 2:
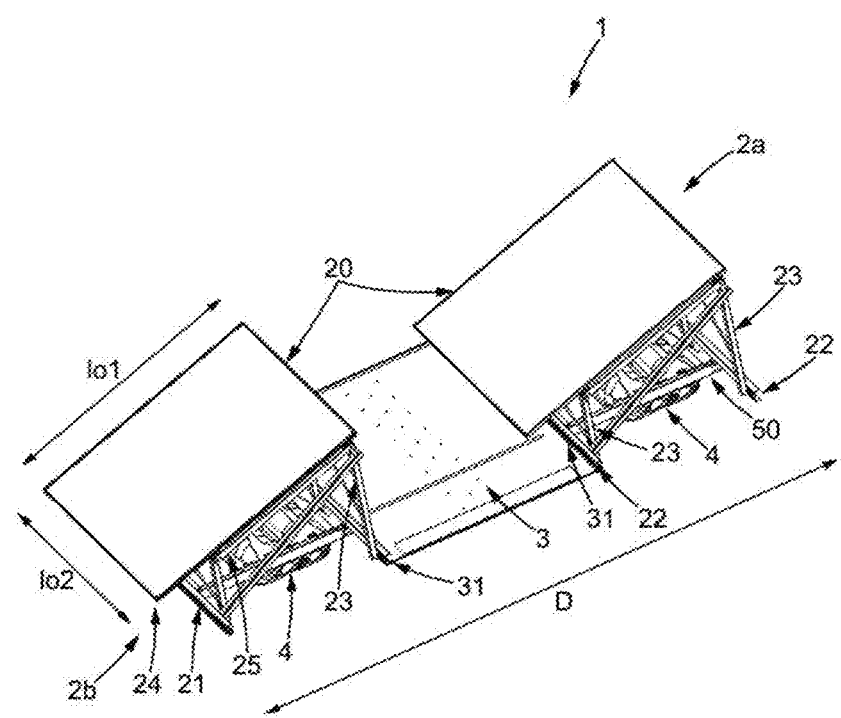
FIG. 2 schematically illustrates a second example of a photovoltaic installation.
Figure 3:
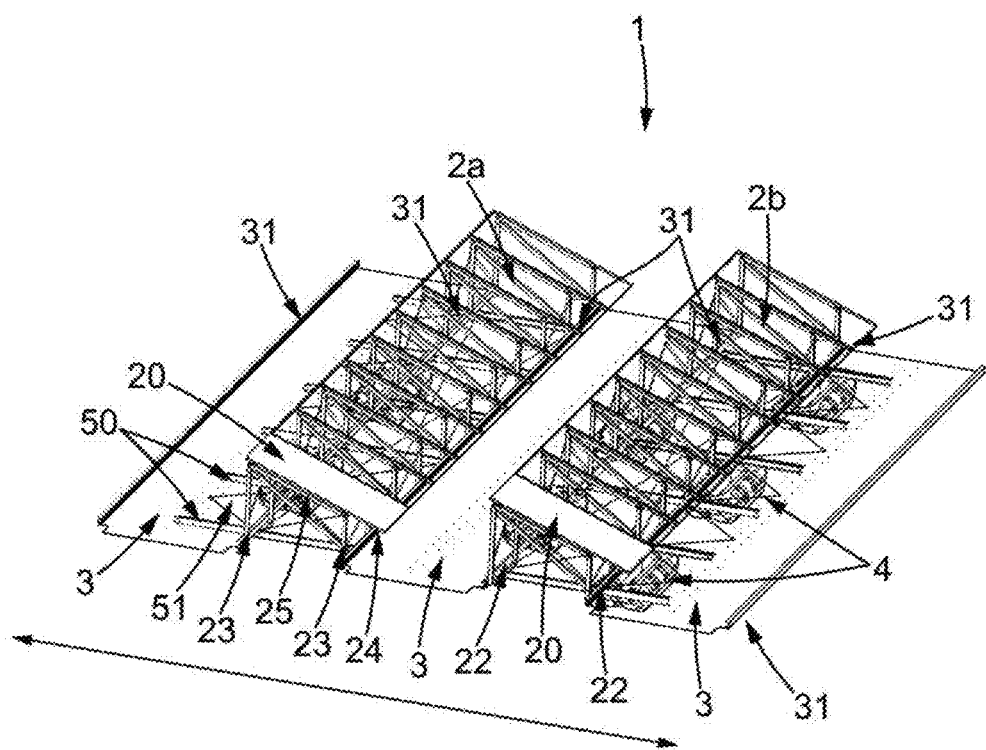
FIG. 3 schematically illustrates a third example of a photovoltaic installation.

Referring to FIGS. 1 to 3, a photovoltaic installation 1 able to float on a body of water's surface is now described. This surface may for example be a natural or artificial lake, a pond, or even the surface of the ocean, preferably in an area with little exposure to waves and currents, for example a port, a creek, a lagoon, etc. With the photovoltaic installation 1 from the present disclosure, the repair and maintenance operations of the operators on the installation can be easier while improving the efficiency of electricity production of known floating photovoltaic installations.

The photovoltaic installation 1 comprises at least two photovoltaic modules 2, a reflector 3 and a flotation device 4 in order to make the photovoltaic installation 1 float on a water's surface. On FIGS. 1 to 3, a first photovoltaic module is referenced 2a and a second photovoltaic module is referenced 2b. FIG. 3 represents an example of a photovoltaic installation 1 comprising two rows of photovoltaic modules wherein one row of photovoltaic modules comprises the first photovoltaic module 2a and the second row of photovoltaic modules comprises the second photovoltaic module 2b.

The photovoltaic modules 2 may be photovoltaic modules comprising a monofacial photovoltaic panel 20 or a bifacial photovoltaic panel 20.

A monofacial photovoltaic panel designates a photovoltaic panel comprising an upper surface suited for generating electricity by photovoltaic effect and a lower surface. The upper surface of a monofacial photovoltaic panel is thus equipped with photovoltaic cells suited for converting photons into electric energy by photovoltaic effect. The lower surface for its part does not have any photovoltaic cells. The upper surface of the photovoltaic panel corresponds to the surface of the panel intended to be oriented towards the sky. The upper surface of the panel is therefore intended to receive direct solar radiation.

A bifacial photovoltaic panel 20 designates a photovoltaic panel comprising an upper surface and a lower surface suited for generating electricity by photovoltaic effect. In other words, the upper and lower surface of a bifacial photovoltaic panel 20 are equipped with photovoltaic cells suited for converting photons into electric energy by photovoltaic effect. The upper surface of the bifacial photovoltaic panel 20 corresponds to the surface of the panel intended to be oriented towards the sky and is therefore intended to receive direct solar radiation. The lower surface of the bifacial photovoltaic panel corresponds to the surface of the panel intended to be oriented towards the water's surface and is therefore intended to receive reflected solar radiation, for example reflected by the reflector 3.

A photovoltaic panel 20 may in particular comprise a frame 24 securing the upper surface and the lower surface of the panel and forming the lateral edges of the photovoltaic panel 20.

The photovoltaic panel 20 of a photovoltaic module 2 may be a single-tilt (monopitch) or a dual-tilt (bipitch) photovoltaic panel, as well known to the person skilled in the art.

A photovoltaic module 2 comprises a bearing structure 21 suited for bearing a photovoltaic panel 20. The bearing structure 21 may for example be made of a metal alloy or a composite material. The bearing structure 21 for a photovoltaic module is distinct from the flotation device 4 in the sense that it alone does not make it possible for the photovoltaic module to float. The bearing structure can also be suited to lift up the photovoltaic panel 20 relative to the reflector 3. The bearing structure 21 for a photovoltaic module may in particular be assembled to the frame 24 of the photovoltaic panel 20.

In some examples, the flotation device 4 may comprise a flotation element 4 mechanically connected to the bearing structure 21 of a photovoltaic module 2 and allowing making this module float. In other examples and in particular in those shown in FIGS. 2 and 3, the flotation device 4 is connected to the bearing structure 21 of the modules by an intermediate structure which will be described in detail below. A flotation element may for example comprise a hollow framework and attachment means for being assembled to the bearing structure 21 for a photovoltaic module or for being assembled to the intermediate structure of the photovoltaic installation. In some examples, a flotation element may in particular comprise a flotation collar.

As shown in FIGS. 1 to 3, in the photovoltaic installation 1 of the present disclosure, the two photovoltaic modules 2 are suited for being oriented substantially along a single axis when the photovoltaic installation is deployed. The orientation axis of the modules is referred to by the arrow D in the figures.

The orientation along one axis of the two photovoltaic modules 2 designates here the fact that the planes tangent to the corresponding surfaces of the photovoltaic panels 20 of the two modules are substantially parallel when the photovoltaic installation 1 is deployed.

In examples in which the photovoltaic panels 20 of the photovoltaic modules 2 are single-tilt, the axis along which the photovoltaic panels 20 of the two modules are oriented when the installation is deployed may correspond to a north-south axis, where the panels are inclined such that the upper surface is directed southward.

In other examples in which the photovoltaic panels 20 of the photovoltaic modules 2 are dual-tilt, the axis along which the photovoltaic panels 20 of the two modules are oriented when the installation is deployed may correspond to an east-west direction, where a portion of the upper surface of the panels corresponds to a slope oriented towards the east and the other portion corresponds to the slope oriented west.

A first length Io1 of the photovoltaic modules 2 may thus be defined corresponding to the spacing of the photovoltaic modules 2 along the axis of orientation and a second length Io2 of the photovoltaic modules may be defined corresponding to the spacing of the modules along the direction perpendicular to the axis of orientation of the modules, as shown in FIG. 2.

Further, as shown in FIGS. 1 to 3 in the photovoltaic installation 1 of the present disclosure, the two photovoltaic modules 2a and 2b are also suited for being oriented substantially aligned when the photovoltaic installation 1 is deployed. The two photovoltaic modules 2a and 2b therefore formed a line of two photovoltaic modules 2.

The fact that two photovoltaic modules are substantially aligned when the photovoltaic installation 1 is deployed means that the corresponding lateral edges of their respective photovoltaic panels which extend parallel to the axis of orientation of the modules are aligned.

The two photovoltaic modules 2a and 2b are also separated by a determined distance along the axis of orientation of the modules. This distance is suited for allowing the passage of an individual. The fixed distance may for example be greater than 50 cm, greater than 1 m, or greater than 2 m.

In the examples in which the installation is intended to be deployed in Europe, the fixed distance may for example be included between 2 and 3 m, advantageously between 2 and 2.4 m.

In other examples in which the installation is intended to be deployed in the Middle East or North Africa, the fixed distance may for example be included between 1 and 2 m, advantageously between 1.3 and 1.7 m.

Concerning the reflector 3 from the photovoltaic installation 1, it comprises two opposite ends 31 respectively assembled to the bearing structure 21 of the first photovoltaic module 2a and to the bearing structure 22 of the second photovoltaic module 2b. In other words, the reflector 3 is attached by an upper end 31 to the bearing structure of the first module 2a and attached by a second end 31, opposite to the first end 31, to the bearing structure of the second module 2b such that the reflector 3 extends between the photovoltaic modules. The reflector thus comprises an upper surface oriented towards the sky and one lower surface oriented towards the water's surface.

The inventors cleverly remarked that the solar radiation received by a reflector is greater in the case where the reflector extends between two photovoltaic modules as shown by the present disclosure than in the case where the reflector is positioned under the photovoltaic module as proposed by the prior art. In fact, in this case, the photovoltaic module itself, in particular the photovoltaic panel, casts a shadow on the reflector 3 such that the radiation that it receives is attenuated. In contrast, when the reflector 3 extends between the two modules, the modules do not cast a shadow or do not cast much shadow on the reflector, such that the radiation received by the reflector is significant. In particular, the radiation received by the reflector is reflected by said reflector in order to increase the number of photons captured by the photovoltaic panels 20 of the modules. Consequently, increasing the radiation received by the reflector 3 allows increasing its reflected radiation and therefore allows, in the end, increasing the number of photons captured by the photovoltaic panels 20 of the photovoltaic modules 2 in that way improving the electricity production capacity thereof.

Further, it is understood that the implementation example for the photovoltaic installation 1 described above comprises only two photovoltaic modules aligned and oriented along a single axis of orientation, but that the photovoltaic installation 1 could have more than two photovoltaic modules aligned and several reflectors 3 extending each between two adjacent photovoltaic modules of the alignment. To this extent, the characteristics of the modules of the reflector 3 presented in the present disclosure may apply to each module 2 and each reflector 3 from the examples of photovoltaic installations described in the present disclosure, in particular to the modules of the rows of photovoltaic modules shown in FIG. 3.

In the examples, a first end 31 of a reflector 3 may be assembled to a first end 31 of the bearing structure 21 of an end photovoltaic module 2 from a line of photovoltaic modules 2 and may extend in a direction opposite the other modules of the line of photovoltaic modules. In this configuration, the second end 31 of the reflector 3 is not assembled to another module, but is arranged to extend above the water's surface, possibly resting on the water's surface. It is understood that in a photovoltaic installation 1 comprising two photovoltaic modules, each of the two modules corresponds to an end module of the line such that a reflector 3 may extend from each of them in a direction opposite to the other module. This example is shown for two rows of modules in FIG. 3 in which two reflectors 3 extend respectively from one row of photovoltaic modules in a direction opposite the other row of modules. The fact that the reflector extends from the bearing structure 21 of an end module of the line on the water's surface serves to increase the electricity generation of the photovoltaic panel 20 of the end module. In the specific examples in which the photovoltaic modules 2 of the line of photovoltaic modules 2 are monoslope, as shown in FIG. 1, the reflector 3 advantageously extends from the bearing structure 21 of the last photovoltaic module 2 placed at the end of the line opposite the direction in which the photovoltaic panels of the monoslope modules are oriented. In the context of FIG. 1, it could therefore involve a reflector 3 extending from the bearing structure 21 of the module 2a, opposite from the module 2b, over the water's surface.

In some examples, the reflector 3 corresponds to a reflecting tarpaulin. For example, the reflecting tarpaulin may be white. It may be woven from white thread or painted white; or again made from a highly reflecting material. When the installation is deployed, the reflecting tarpaulin is stretched between the photovoltaic modules in order to provide a good reflection of solar radiation.

In some examples, the reflector 3 is further adapted for supporting the weight of at least one person moving on the reflector between the two photovoltaic modules. To the extent where the reflector 3 extends between two modules, it may be used as a path for movement, or a walkway between the modules for one or more operators. Consequently, in these examples, the reflector 3 according to the present disclosure also allows operators easy access to the photovoltaic modules when the installation is deployed. The repair and maintenance of the modules, in particular of the photovoltaic panels 20, are therefore made easier. In other words, in these examples, the arrangement of the reflector 3 increases the production efficiency of the photovoltaic installation 1 while also facilitating the repair and maintenance thereof. In some examples, the reflector 3 is for example suited for supporting a weight over 40 kg. In some examples, the reflector is for example suited for supporting a weight included between 40 kg and 1000 kg, and preferably suited for supporting a weight included between 40 kg and 180 kg. This may be obtained by using a tarpaulin formed of a suitable material and/or obtained by a sufficiently close weaving to form the reflector. As a nonlimiting example, a meshed canvas of catamaran trampoline type may be used, by selecting a close mesh in order to get a satisfactory reflection coefficient.

In some examples, and as shown in FIGS. 2 and 3, an end 31 of the reflector 3 assembled to the bearing structure 21 of a photovoltaic module 2 is arranged such that a section of the reflector 3 extends under the photovoltaic panel 20 of the photovoltaic module 2 over at least 10% of the length of the photovoltaic panel 20 along the axis of orientation of the module. Preferably the end 31 of the reflector assembled to the bearing structure 21 of a photovoltaic module 2 is arranged such that a section of the reflector 3 extends under the photovoltaic panel 20 of the photovoltaic module 2 over a range included between 10 and 40% of the length of the photovoltaic panel 20 along the orientation axis of the module. This section of the reflector 3 arranged near the edge of the photovoltaic panel 20 over the length thereof, although located under the photovoltaic panel 20 still receives non-negligible solar radiation, unlike a section of the reflector arranged under the entirely shaded center of the photovoltaic panel 20. This section may therefore reflect the solar radiation that it receives in order to increase the photovoltaic production of a module 2 from the photovoltaic installation 1. It is understood that this embodiment is particularly advantageous for the modules having bifacial photovoltaic panels 20 because the reflected radiation may be captured by conversion into electricity by the lower surface of the photovoltaic panel 20.

In some preferred examples, one end 31 of the reflector assembled to the bearing structure of the first photovoltaic module 2*a* is arranged such that a first section of the reflector extends under the photovoltaic panel of the first photovoltaic module 2*a* over at least 10% of the length of the panel along the axis of orientation; and the other end 31 of the reflector assembled to the bearing structure of the second photovoltaic module 2*b* is arranged such that a second section of the reflector, opposite the first section, extends under the photovoltaic panel of the second photovoltaic module 2*b* over at least 10% of the length of the panel along the axis of orientation. Consequently, in these examples, a section of the reflector 3 extends under the photovoltaic panel 20 of the two modules so as to increase the photovoltaic production of the two modules of the photovoltaic installation 1.

In the examples previously described comprising a section of the reflector 3 extending under the photovoltaic panel of the one or more modules, it does not involve making the reflector 3 extend over the full length of the photovoltaic panel 20 of a module 2 because a section of the reflector 3 located under the center of the photovoltaic panel 20 would be nearly completely shaded by the panel and would therefore benefit from hardly any solar radiation, driving up the cost of the reflector 3 for no or almost no increase of production. On the contrary, the examples previously described propose extending a defined section of the reflector under the photovoltaic panels 20 of the modules 2 while providing for a good compromise between the cost of the reflector and the solar radiation received and reflected by the reflector 3. Further, the fact that one section under the photovoltaic panel does not have the reflector also serves to provide a better cooling of the photovoltaic panel by the water's surface during use thereof.

In some examples, the reflector 3 is configured for avoiding collecting water, i.e. for preventing water accumulation, in particular on the upper surface thereof. The reflector 3 may for example be configured for water to flow from the upper surface thereof to the water's surface. In some first examples, the ends of the reflector 3 are assembled onto the bearing structures of the modules 2 such that the reflector is inclined by a set angle relative to a horizontal axis so that the water which might be found on the upper surface thereof could flow towards the water's surface. The said angle may for example be included between 0.001° and 10° and may advantageously be included between 0.5° and 5°. In some second examples, the reflector comprises a plurality of flow holes allowing the water which is found on the upper surface thereof to flow towards the water's surface. Combining the two examples described above is also conceivable, meaning assembling the ends of the reflector 3 over the bearing structures for the modules so that the reflector is inclined and providing flow holes on the reflector 3. In fact, stagnant water on the reflector leads to a reduction of its reflective nature to the extent that the albedo of the water is less than that of the reflector. The flow of the water will also have the effect of carrying along and evacuating dirt which could accumulate on the reflector.

In some examples, the bearing structure 21 of a photovoltaic module 2 is suited for lifting the photovoltaic panel 20 relative to the reflector 3 and in particular relative to an end of the reflector assembled on this bearing structure 21. The bearing structure 21 of a photovoltaic module 2 of the photovoltaic installation 1 may also comprise, as shown on FIGS. 1 to 3 at least one leg 23. An end 31 of the reflector 3 could thus be assembled to a leg of the photovoltaic module. The leg 23 may for example be vertical, as shown on the figures. The leg 23 at least in part supports the photovoltaic panel 20 of the photovoltaic module 2 such that the photovoltaic panel 20 is raised higher relative to the reflector 3.

In some first examples, an upper end of the leg 23 of the bearing structure 21 of the photovoltaic module 2 may be directly assembled to the photovoltaic panel 20, for example to the frame 24 bearing the photovoltaic panel 20.

In some second examples, the bearing structure 21 of a photovoltaic module 20 may also comprise a panel support 25 assembled to an upper end of at least one foot 23 of the bearing structure 21. In these second examples, the photovoltaic panel 20 may be assembled on the panel support 25; in particular, the frame 24 of the photovoltaic panel 20 may be assembled on the panel support 25 as shown in FIGS. 2 and 3.

In the example shown in FIGS. 2 and 3, panel support 25 assembled to the upper end of a foot 23 of the bearing structure 21 comprises a first oblique strut extending parallel to the axis of orientation of the photovoltaic module 2. In the example shown, the oblique strut extends from the end of the two legs 23 of the module 2 aligned along the axis of orientation of the panels and is assembled to the frame of the panel 24. The oblique strut therefore advantageously has the inclination desired for the panel 20 relative to the horizontal axis. In other examples not shown, the panel support 25 assembled to the upper end of the foot 23 may comprise a horizontal strut extending perpendicularly to the axis of orientation of the photovoltaic module 2, for example between two legs 23 of the module 2 aligned perpendicularly to the axis of orientation. In some last examples, the panel support 25 may comprise both the oblique strut extending from the end of two legs 23 of the module 2 aligned along the axis of orientation of the panels and the horizontal strut extending from the end of the two feet 23 of the module 2 aligned perpendicularly to the axis of orientation of the panels.

The fact of raising the photovoltaic panel 20 relative to the reflector 3 serves to reduce the shade of the photovoltaic panel 20 on the reflector 3, and in particular on the section of the reflector 3 which could extend under the photovoltaic panel 20. Consequently, the fact of raising the photovoltaic panels 20 relative to the reflector serves to increase the effectiveness of the electricity production thereof. In some examples, the leg 23 has a length suited so that the lowest point of the photovoltaic panel 20 is arranged at at least 30 cm high relative to the reflector, advantageously at at least 50 cm high relative to the reflector 3.

In some examples and in particular those shown in FIGS. 2 and 3, the bearing structures 21 for the first 2a and second 2b photovoltaic modules comprise two bearing beams 22 extending perpendicularly to the axis of orientation of the photovoltaic modules. In these examples, an end of the reflector 3 is assembled to a bearing beam 22 of the first module 2a nearest to the second module 2b and the other end of the reflector 3 is assembled to the bearing beam 22 of the second module 2b nearest to the first module 2a. This bearing structure 21 of a module 2 comprising the two bearing beams 22 with an end of the reflector 3 assembled to a bearing beam with which to define the separation of the reflector 3 along the axis of orientation of the modules and in particular to define whether, and possibly to what extent, the reflector extends under the photovoltaic panel 20 of the module. In this case, by bringing the bearing beam 22, on which the end of the reflector 3 is assembled closer to the center of the photovoltaic module 2, the reflector 3 may therefore extend under the photovoltaic panel 20 of the module 2. In other words, in these examples, a bearing beam 22 of the photovoltaic module 2, on which the end of the reflector 3 is assembled, may be set back from an edge of the photovoltaic panel 20 extending perpendicularly to the axis of orientation of the module, such that a section of the reflector 3 extends under the photovoltaic panel 20 along this axis of orientation. In these examples, the bearing beam may be set back from an edge of the photovoltaic panel 20 extending perpendicularly to the axis of orientation of the module, such that one section of the reflector 3 extends under the photovoltaic panel 20 of the photovoltaic module 2 over at least 10%, advantageously between 10 and 40%, of the length of the photovoltaic panel 20 along this axis of orientation.

In some additional examples in which the bearing structures 21 of the modules 2 comprise both bearing beams 22, the bearing structure 21 of the photovoltaic module 2 may further comprise two legs 23. Each leg 23 of the photovoltaic module has a lower end assembled to a respective bearing beam for the photovoltaic module and an upper end assembled to the frame 24 of the photovoltaic panel 20, or to the panel support 25 supporting the photovoltaic panel 20, as applicable. This bearing structure configuration is simple to the extent that it allows assembly of the reflector 3 and mounting the legs 23 with which to raise the panel 20 relative to the reflector 3 on a single mechanical element, thus reducing the cost of the photovoltaic installation 1 by facilitating assembly thereof. These examples are in particular shown on FIGS. 2 and 3.

In some examples, a leg 23 assembled at one lower end on a bearing beam 22 and assembled at one upper end to the photovoltaic panel 20, or to the panel support 25 as applicable, may extend substantially vertically in order to stiffen the bearing structure 21. In some other examples, a leg 23 assembled at one lower end on a bearing beam 22 and assembled at one upper end to the photovoltaic panel 20, or to the panel support 25 as applicable, may extend along a set angle relative to a vertical axis in a direction opposite to the bearing beam adjacent to the one on which it is assembled. In these other examples, the bearing beam 22 of the module 2 assembled to one end 31 of a reflector 3 may be further arranged towards the center of the photovoltaic module along the axis of orientation of the module while solidly supporting the panel or while solidly supporting the panel support 25 itself supporting the panel 20. Consequently, a reflector 3 whose an end 31 could extend from such a bearing beam 22 may further extend under the photovoltaic panel 20.

Further, by choosing the length of the two legs 23 mounted on the bearing beams 22, the person skilled in the art can define both the elevation of the photovoltaic panel 20 relative to the reflector 3 and the inclination thereof relative to the horizontal axis while also guaranteeing a solid mounting of the photovoltaic panel on the bearing structure 21 of the module 2. In fact, by selecting one leg 23 shorter than the other, the photovoltaic panel 20 is inclined relative to the horizontal axis.

In some examples in which the modules 2a and 2b comprise a biface monoslope photovoltaic panel and that the photovoltaic installation is intended to be deployed in Europe, the inclination of the photovoltaic panel 20 of the modules relative to the horizontal axis is included between 23 and 27°. This inclination allows an efficient electric generation from the photovoltaic installation for this geographic zone.

In other examples in which the modules 2a and 2b comprise a biface monoslope photovoltaic panel and that the photovoltaic installation is intended to be deployed in the Middle East or North Africa, the inclination of the photovoltaic panel 20 of the modules relative to the horizontal axis is included between 18 and 22°. This inclination allows an efficient electric generation from the photovoltaic installation for these geographic zones.

In other examples in which the modules 2a and 2b comprise a biface dual-tilt photovoltaic panel, the inclination of the slopes of the photovoltaic panel 20 of the modules relative to a horizontal axis is included between 8 and 12°. This inclination allows an efficient electrical generation from the photovoltaic installation when the axis of orientation of the modules after the installation is deployed corresponds to an east-west axis.

In other examples in which the modules 2a and 2b comprise a monoface photovoltaic panel, the inclination of a slope of the photovoltaic panel 20 of the modules relative to a horizontal axis is over 30°. These examples may apply whether it involves a monoslope or a dual-tilt photovoltaic panel. This inclination, larger than for a bifacial photovoltaic panel, serves to increase the production from the photovoltaic installation 1 because the reflection of the solar radiation on the reflector 3 is further captured by the upper surface of the electricity generating photovoltaic panel.

In some examples, the photovoltaic installation 1 may comprise an intermediate structure. The intermediate structure is assembled to the floating device 4 and is assembled to the bearing structures 21 of the photovoltaic modules in a line of photovoltaic modules 2. The intermediate structure extends therefore along the axis of orientation of the aligned modules. It is arranged for assuring the alignment of the modules 2 along the axis of orientation and for connecting the floating device 4 to the bearing structures 21 of the aligned modules 2 so as to allow the floating of the line of photovoltaic modules. The intermediate structure also serves to maintain a constant determined distance between the modules and to do so despite the movement of the water's surface. The intermediate structure is advantageously assembled under the bearing structure 21 of the aligned modules so as to make the deployment of the reflector easier and to avoid casting shadow on the reflector.

In some examples, the intermediate structure of a line of photovoltaic modules may for example comprise two spars 50 extending parallel to each other along the axis of orientation of the modules of the line as shown on FIG. 3. The spars 50 therefore assure the alignment of the modules of the line while avoiding a relative movement of the modules from a single line relative to each other. In these examples, and as shown in FIGS. 1 and 2, the spars 50 are assembled on the flotation elements 4 so as to allow the line of modules to float. The intermediate structure may also comprise a bracing 51 assembled between the spars so as to maintain the spars 50 parallel to each other. The bracing 51 may for example form one or more crosses between the spars 50 as shown on FIG. 3. Further, in some examples wherein the bearing structure 21 for the photovoltaic modules 2 of the line of photovoltaic modules comprises bearing beams 22, the bearing beams 22 may be assembled on the spars 50, perpendicularly to the axis of orientation of the modules as shown in FIGS. 2 and 3. In this way, the bracing is arranged at a height below that of the reflector 3 so as not to cast a shadow on the reflector 3 which could reduce the radiation received by the reflector.

In some preferred embodiments shown in FIG. 3, the photovoltaic installation 1 may comprise two rows of photovoltaic modules 2. The first row of photovoltaic modules comprises the first photovoltaic module 2a. A second row of photovoltaic modules comprises the second photovoltaic module 2b and faces the first row. The rows of photovoltaic modules, as shown on FIG. 3 extend substantially perpendicular to the axis of orientation of the first and second photovoltaic modules. The rows of photovoltaic modules 2 therefore extend substantially parallel to each other, and perpendicularly to the lines of photovoltaic modules. The rows of photovoltaic modules may correspond to a plurality of lines of photovoltaic modules, adhered to each other.

In some examples in which the photovoltaic installation 1 comprises two rows of modules, the reflector 3 extends between the rows of photovoltaic modules, as shown in FIG. 3.

Consequently, in these embodiments, a reflector 3 forms a path for movement, or a walkway, between two rows of adjacent modules in addition to reflecting solar radiation. As previously explained, this makes repair and maintenance operations in rows of photovoltaic modules easier for the operators who can move on the reflector.

Further, it is understood that the embodiment from FIG. 3 is shown for two rows of photovoltaic modules because it involves an extended embodiment of the photovoltaic installation 1 comprising the first 2a and second 2b photovoltaic modules. However, the photovoltaic installation 1 could have more than two parallel rows of photovoltaic modules and several reflectors 3 each extending between two adjacent rows of photovoltaic modules.

In the examples comprising two rows of photovoltaic modules 2, the bearing structures 21 of the first 2a and of the second 2b photovoltaic module may be in part shared with the other photovoltaic modules of their respective row.

In particular, in examples where the bearing structure 21 of one photovoltaic module comprises the bearing beams 22, these bearing beams 22 may be shared with the other photovoltaic modules of the row to which they belong, as shown on FIG. 3. The bearing beams 22 are therefore the length of the row of photovoltaic modules 2 and the remainder of the bearing structure 21 of the photovoltaic modules 2 may be assembled on the bearing beams 22 shared between the modules. In particular, as shown in FIG. 3, the legs 23 supporting the photovoltaic panels 20 of the modules are assembled to the shared bearing beams at the rows of photovoltaic modules. In this way, the opposite ends of the reflector 3 assembled to the bearing beams 22 of the bearing structure 21 of the first 2a and second 2b photovoltaic modules are assembled on the bearing beams 22 of the first and second rows of photovoltaic modules. In particular, the opposite ends of the reflector 3 assembled to the bearing structure 21 of the first 2a and second 2b photovoltaic modules may be assembled onto the spar of the bearing beams 22 for the two rows of photovoltaic modules as shown in FIG. 3 such that the reflector 3 extends over the length of these rows.

Further, in examples where the bearing structure 21 of a photovoltaic module comprises a panel support 25 having a horizontal strut extending perpendicularly to the axis of orientation of the modules, this horizontal strut may be shared with the modules from the row of photovoltaic modules to which it belongs. In this way, the horizontal strut of the panel support 25 may support several adjacent photovoltaic panels from the row of modules.

With the examples for photovoltaic installations presented by the present disclosure, the photovoltaic production of the installations according to the prior art can be improved by clever arrangement of the reflectors between two aligned modules or between two rows of modules so as to reflect the solar radiation onto the photovoltaic panels. Further, in some examples, the characteristics of these reflectors are such that they are suited for supporting the weight of a person, in that way these reflectors can be used as a path for movement or a walkway between two aligned modules and possibly between two rows of modules, in particular for allowing the repair and maintenance thereof. In these examples, the reflector therefore has a double function: the first function thereof is that of reflecting the solar radiation to allow increasing the generation of electric production by the photovoltaic installation, and a second function is creating a usable path for movement in order to allow the repair and maintenance of the photovoltaic installation by operators.

Figure 4A:
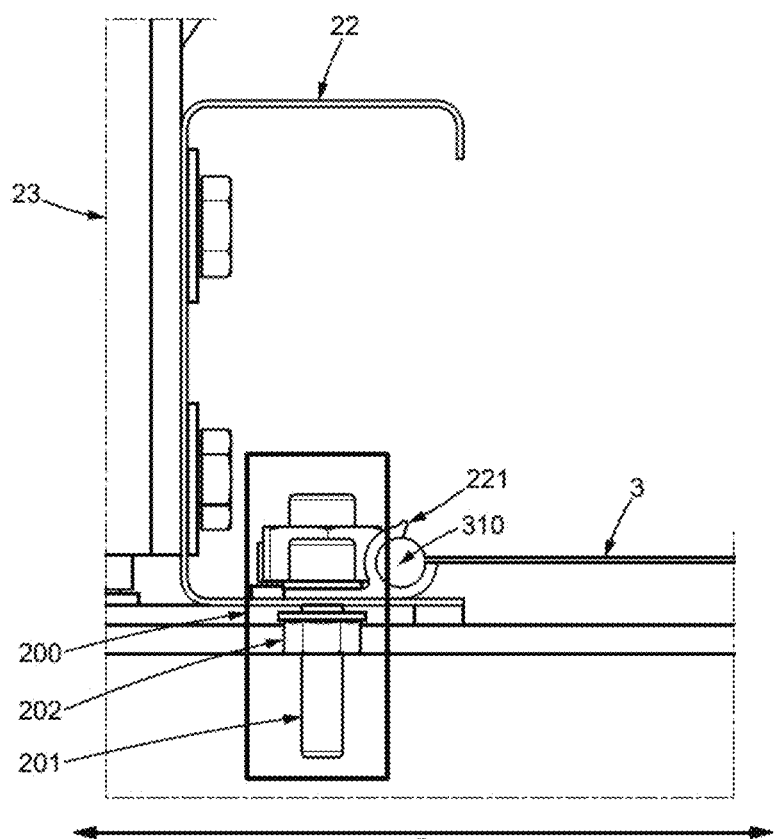
FIG. 4a schematically illustrates an example of a system for assembly of a reflecting tarpaulin on a bearing structure for a photovoltaic module.
Figure 4B:
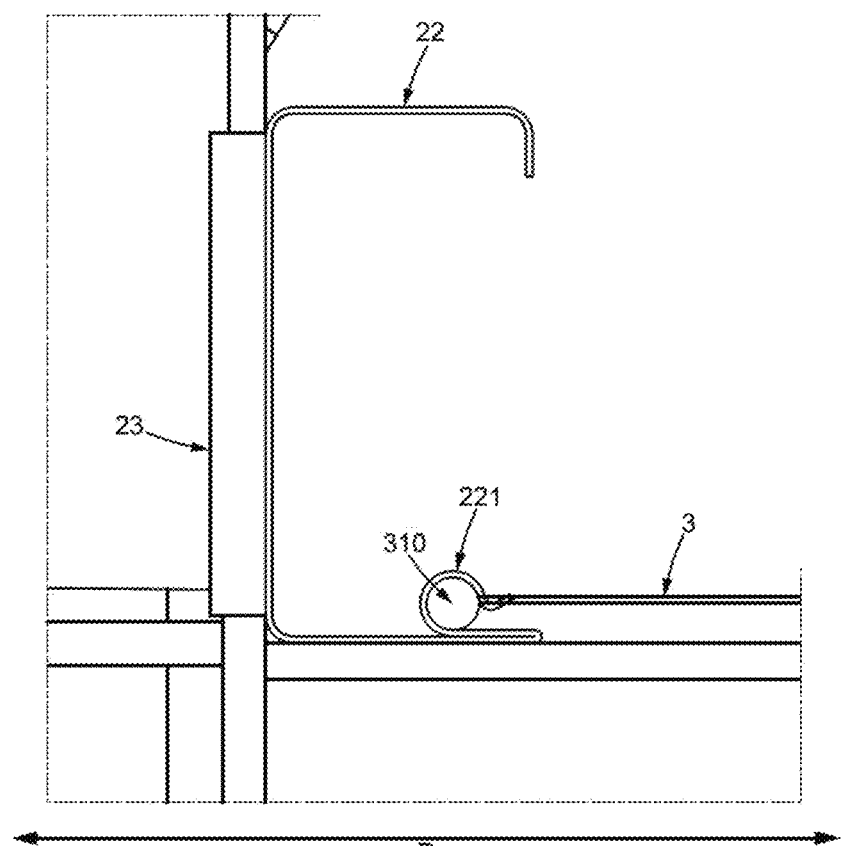
FIG. 4b schematically illustrates another example of a system for assembly of a reflecting tarpaulin on a bearing structure for a photovoltaic module.
Figure 4C:
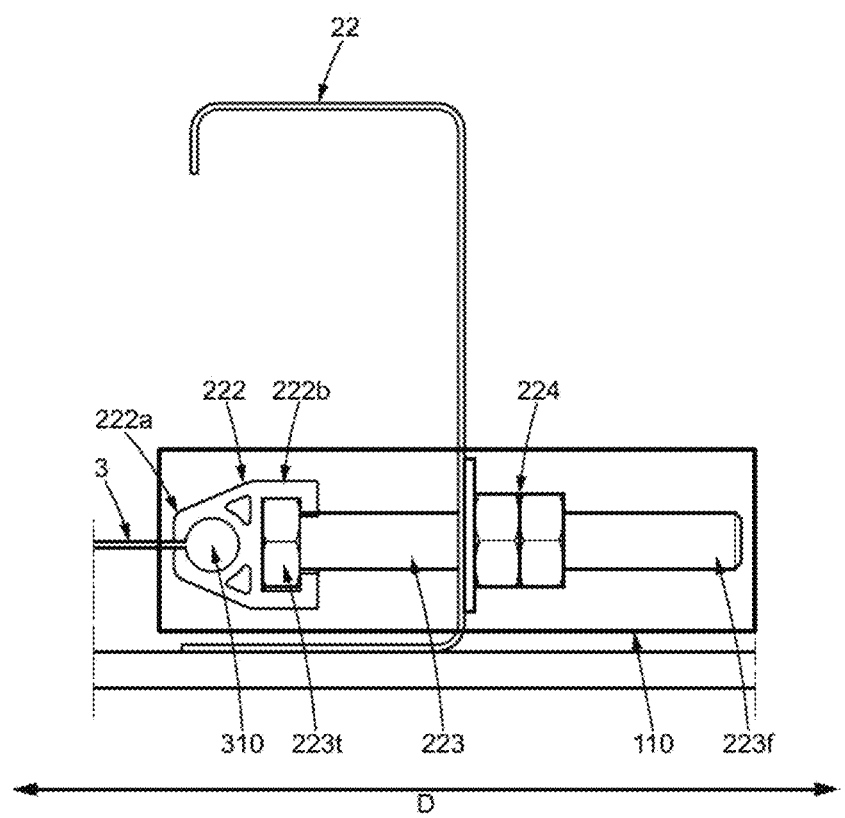
FIG. 4c again schematically illustrates yet another example of a system for assembly of a reflecting tarpaulin on a bearing structure for a photovoltaic module.

Referring to FIGS. 4a, 4b and 4c, three examples are now presented of a system for assembly of an end of a reflecting tarpaulin 3 to the bearing structure 21 of a photovoltaic module 2 in some embodiments in which the bearing structure 21 of the module comprises bearing beams 22. FIGS. 4a, 4b and 4c represent a side view of a module 2 in the area of the bearing beam 22 on which an end of a reflecting tarpaulin 3 is assembled. The example of an assembly system 100 shown may also be used for assembling an end of a reflecting tarpaulin 3 to a bearing beam 22 of the bearing structure 21 shared between the modules 2 of a row of modules 2.

In the examples from FIGS. 4a and 4b, the assembly system may comprise a profile 221 suited for engaging with an end 31 of the reflecting tarpaulin 3 so as to assemble the profile 221 and the extremity 31 of the reflecting tarpaulin 3 together. The end 31 of the reflecting tarpaulin may for example comprise a rod 310 extending over a length of the reflecting tarpaulin perpendicular to the orientation axis of the modules, and having a length suited to the bearing beam 22 on which it is going to be assembled. The profile 221 may be shaped according to a shape and a length complementary to that of the rod 310 such that the rod 310 may be received and held in the profile 221.

In the example from FIG. 4*a*, profile 221 is assembled to the bearing beam 22 of the photovoltaic module 2 by the attachment system 200, for example using a screw or rivet. More precisely, in the example shown, the attachment system 200 comprises a screw 201 engaging with an attachment nut 202. The screw 201 passes through a section of the profile 221 and a section of the bearing beam 22 before passing through the attachment nut 202 so as to allow the assembly of the profile 221 to the bearing beam 22. After that, when the rod 310 of the reflecting tarpaulin 3 is received in the profile 221, it is assembled with the bearing beam 22 of the module 2 on which the profile 221 is assembled.

In the example from FIG. 4*b*, the profile 221 is directly formed on the bearing beam 22 and forms an integral part of the bearing beam. The bearing beam 22 is therefore shaped to have the profile 221. In that way, when the rod 310 of the reflecting tarpaulin 3 is received in the profile, it is no longer necessary to use an attachment system for assembling the profile 221 to the bearing beam 22.

It is understood that in these configurations, the profile 221; whether it is assembled on the bearing beam 22 of the module 2 as shown in FIG. 4*a*, or it is an integral part of the bearing beam 22 of the module 2 as shown in FIG. 4*b*; extends over the length of the bearing beam 22 of the module. Consequently, in the case of a row of photovoltaic modules having a bearing structure 21 with bearing beams 22 shared between the modules 2 of the same row, the profile 221 may extend over the length of the bearing beam 22 of the module row, and the length of the reflecting tarpaulin perpendicular to the orientation of the modules may be fitted to the length of this profile 221 in order to assemble the end 31 of the reflecting tarpaulin 3 to the row of modules.

It is also understood that the assembly system example from FIG. 4*a* or 4*b* using the engagement of a rod 310 and a profile 221 may be used for assembling each of the ends of the reflecting tarpaulin 3 onto respective bearing beam 22 thereof, whether these bearing beams 22 are those for the two photovoltaic modules 2*a* and 2*b* or those shared by the photovoltaic modules 2 with two rows of photovoltaic modules 2.

The rod/profile assembly system example shown is advantageous in so far as it is low cost and it allows an easy assembly compared to systems having several different anchoring points, in particular using grommets, between the reflecting tarpaulin and the bearing beam.

In the example from FIG. 4*c*, the assembly system comprises a tensioning system 110 and the end 31 of the reflecting tarpaulin also comprises a rod 310 extending along the length of the reflecting tarpaulin 3 perpendicular to the axis of orientation of the modules. The rod 310 is assembled to the bearing beam 22 by the tensioning system 110. The tensioning system 110 is adapted to stretch the reflecting tarp, for example by bringing the rod 310 closer to the bearing beam 22 along the axis of orientation of the module.

In the example shown, the tensioning system 110 comprises a profile 222 shaped for receiving the rod 310 at one first end 222*a* and shaped for receiving a screw head 223*t* at a second end 222*b* opposite to the first end. The second end 222*b* of the profile 222 is shaped so as to block a rotation of the screw head 223*t* in the profile 222. The screw 223 having the screw head 223*t* extends along the length of the axis of orientation of the module 2 and crosses the bearing beam 22, as shown in FIG. 4*c*, so as to connect the profile 222 to the bearing beam 22. To this extent, when the rod 310 of the reflector 3 is engaged in the first end 222*a* of the profile 222 of the tensioning system 110, it assembled to the bearing beam 22. The tensioning system 110 also comprises a nut 224 in contact with the bearing beam 22 and with which to attach the screw 223 to the bearing beam. In the present case, the end 223*f* of the screw 223, opposite the screw head 223*t* from which extends the threading (not shown) of the screw 223, is engaged in the nut 224. In this way, by rotating the nut 224 towards the screw head 223*t*, the nut 224 comes to bear on the bearing beam 22 which comes closer to the profile 222 and which therefore brings the rod 310 of the tarp 3 held in the profile 222 closer. To the extent where the determined distance between the bearing beams 22 on which the two ends of the tarpaulin 3 are respectively assembled is constant, bringing a bearing beam 22 of the rod 310 of the tarpaulin closer results in tensioning of the tarpaulin 3. The tension of the tarpaulin may therefore be increased until the bearing beam 22, pushed by the nut 224 when it is rotated, comes to stop against the screw head 223*t*.

In the same way as before, it is understood that the assembly system example having a tensioning system 110, in particular the one from FIG. 4*c*, may be used for assembling each of the ends of the reflecting tarpaulin 3 onto the respective bearing beam 22 thereof, whether these bearing beams 22 are those for the two photovoltaic modules 2*a* and 2*b* or those shared by the photovoltaic modules 2 with two rows of photovoltaic modules 2.

The invention claimed is:

1. A photovoltaic installation able to float and to allow producing electricity comprising a first photovoltaic module, a second photovoltaic module, a reflector and a flotation device able to make the photovoltaic installation float, wherein:
   each photovoltaic module comprises a photovoltaic panel and a bearing structure, distinct from the flotation device and adapted to carry the photovoltaic panel;
   the two photovoltaic modules are oriented along a single axis and are aligned along this axis, separated by a determined distance, said distance being adapted to allow the passage of an individual between the modules; and
   the reflector comprises two opposite ends respectively assembled to the bearing structure of the first photovoltaic module and of the bearing structure of the second photovoltaic module; and
   wherein the reflector is a reflecting tarpaulin stretched between and directly connected to the first photovoltaic module and the second photovoltaic module along the entirety of said distance adapted to allow the passage of an individual between the modules.

2. The photovoltaic installation according to claim 1, wherein:
   the photovoltaic panel of a module is a monofacial photovoltaic panel comprising an upper surface adapted to generate electricity by photovoltaic effect; or
   the photovoltaic panel of a module is a bifacial photovoltaic panel comprising an upper surface and a lower surface adapted to generate electricity by photovoltaic effect.

3. The photovoltaic installation according to claim 1, wherein the reflector is further adapted to support the weight of at least one person moving on the reflector between the two photovoltaic modules.

4. The photovoltaic installation according to claim 1, wherein an end of the reflector assembled to the bearing structure of a photovoltaic module is arranged such that a section of the reflector extends under the photovoltaic panel of the photovoltaic module over at least 10% of the length of the photovoltaic panel along said single axis.

5. The photovoltaic installation according to claim 1, wherein the bearing structure for the photovoltaic modules is adapted to raise the photovoltaic panel above the reflector.

6. The photovoltaic installation according to claim 1, wherein the bearing structures of the first and second photovoltaic modules comprise two bearing beams extending perpendicularly to said single axis of the photovoltaic modules; and
    an end of the reflector is assembled to a bearing beam of the first module nearest to the second module and the other end of the reflector is assembled to the bearing beam of the second module nearest to the first module.

7. The photovoltaic installation according to claim 6, wherein a bearing beam of a photovoltaic module on which an end of a reflector is assembled is set back from an edge of the photovoltaic panel extending perpendicularly to said single axis of the module, such that a section of the reflector extends under the photovoltaic panel along this axis of orientation.

8. The floating photovoltaic installation according to claim 7, wherein the bearing structure of a photovoltaic module comprises two legs and a panel support; each leg having a lower end assembled to a respective bearing beam and an upper end assembled to the panel support; and the photovoltaic panel is assembled on the panel support.

9. The photovoltaic installation according to claim 6, wherein:
    an end of the reflecting tarpaulin comprises a rod extending along the length of the reflecting tarpaulin perpendicular to the orientation axis of the modules; and
    a profile, shaped according to a shape complementary to that of the rod, extends over a specific bearing beam of a module on which an end of the reflecting tarpaulin is assembled so that the rod is received within the profile and that the end of the reflecting tarpaulin is held assembled to the specific bearing beam.

10. The photovoltaic installation according to claim 9, wherein:
    the profile is formed on a specific bearing beam and therefore constitutes an integral part of the specific bearing beam; or
    the profile is assembled to the specific bearing beam by an attachment system.

11. The photovoltaic installation according to claim 6, wherein:
    an end of the reflecting tarpaulin comprises a rod extending along the length of the reflecting tarpaulin perpendicular to the axis of orientation of the modules; and
    the rod is assembled to a bearing beam of a module to which an end of the reflecting tarpaulin is assembled by a tensioning system adapted to tension the reflecting tarpaulin.

12. The photovoltaic installation according to claim 1, comprising two rows of photovoltaic modules, wherein:
    a first row of photovoltaic modules comprises the first photovoltaic module and extends substantially perpendicular to said single axis of the first and second photovoltaic modules;
    a second row of photovoltaic modules comprises the second photovoltaic module and extends substantially perpendicular to said single axis of the first and second photovoltaic modules; and
    wherein the opposite ends of the reflector are assembled so that the reflector extends between the two rows of photovoltaic modules.

13. The photovoltaic installation according to claim 1, wherein the reflector is configured to prevent water accumulation.

* * * * *